June 22, 1965　　　E. A. NEU, JR　　　3,190,070
REACTION MOTOR CONSTRUCTION
Filed April 5, 1950　　　　　　　　　　　　4 Sheets-Sheet 1
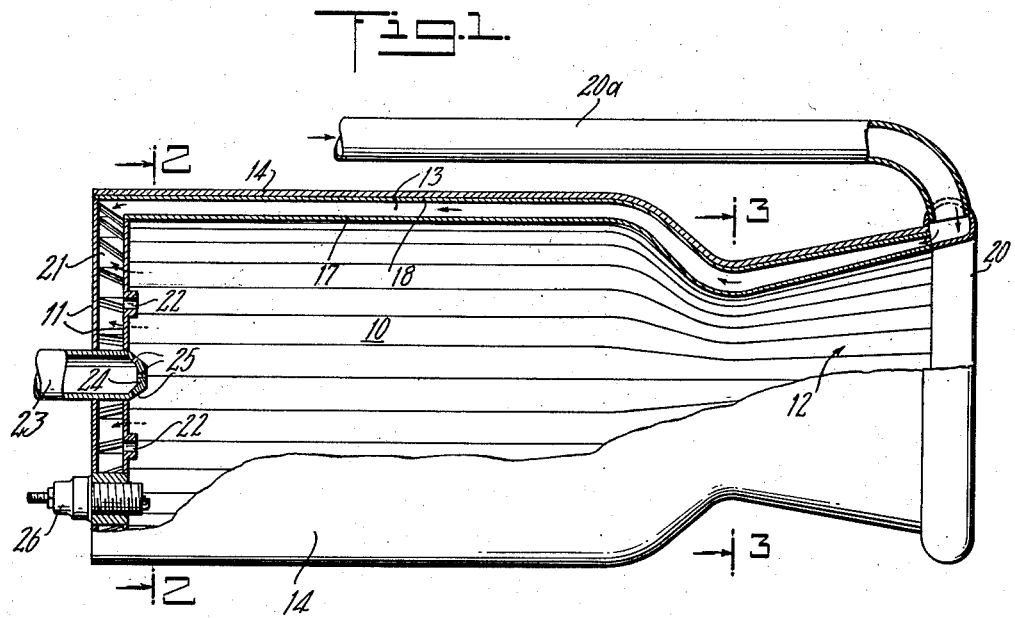
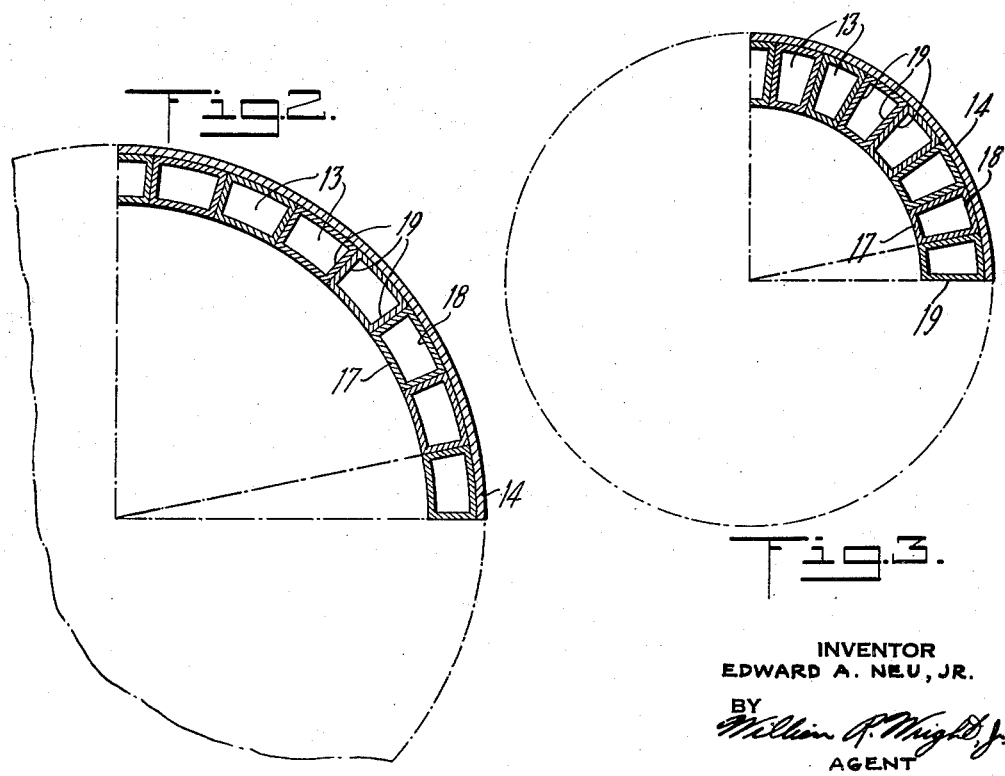
INVENTOR
EDWARD A. NEU, JR.
BY
*William R. Wright Jr.*
AGENT

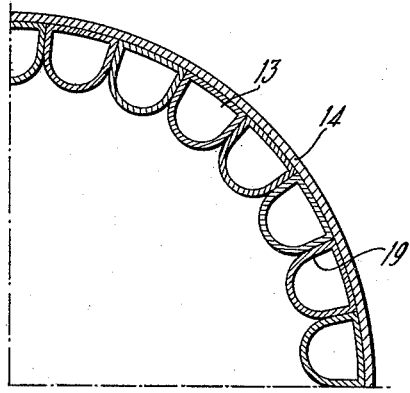
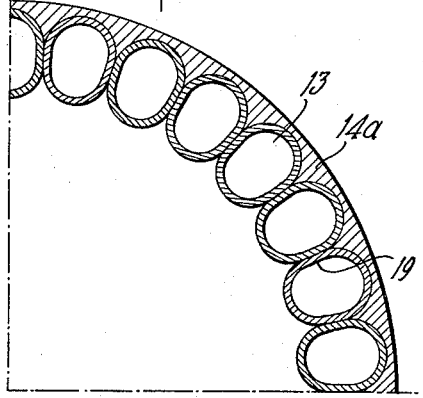
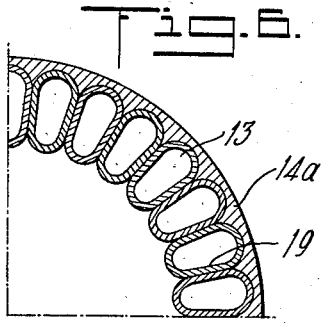
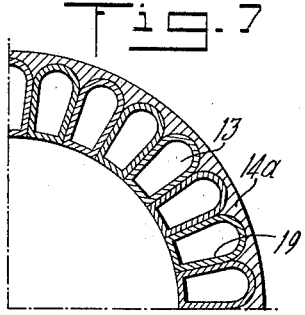
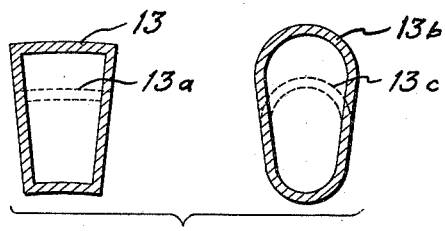

June 22, 1965  E. A. NEU, JR  3,190,070
REACTION MOTOR CONSTRUCTION
Filed April 5, 1950  4 Sheets-Sheet 3
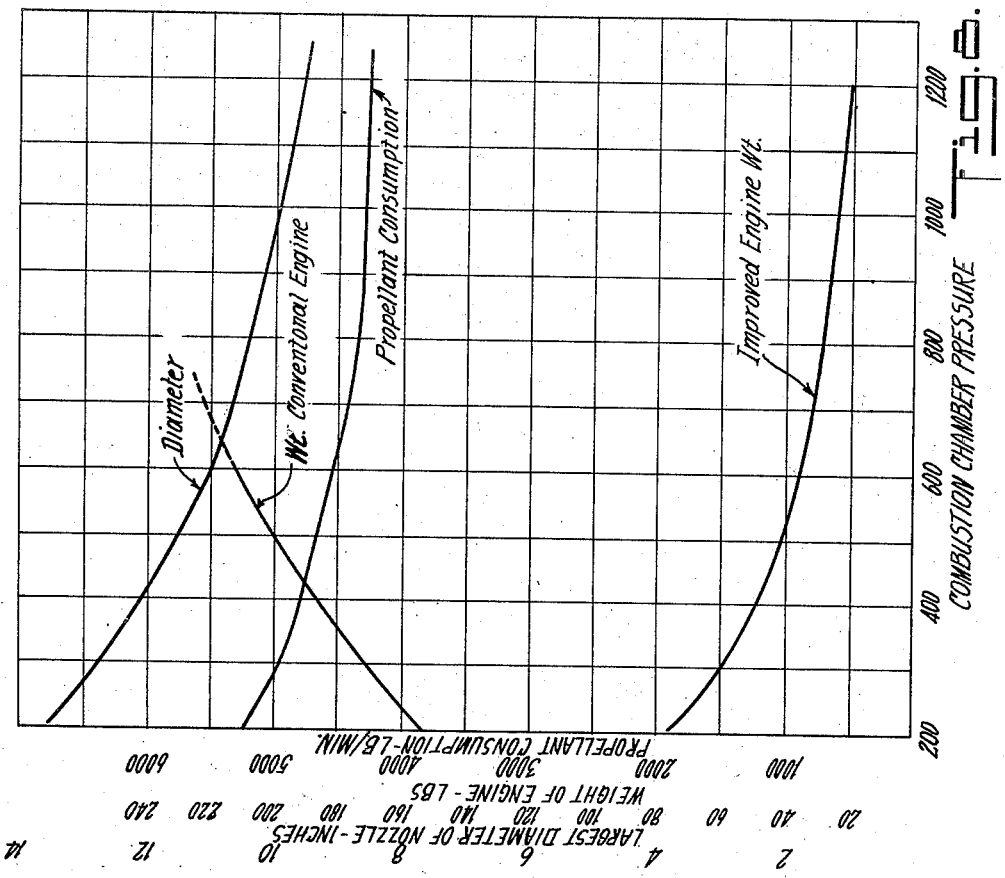
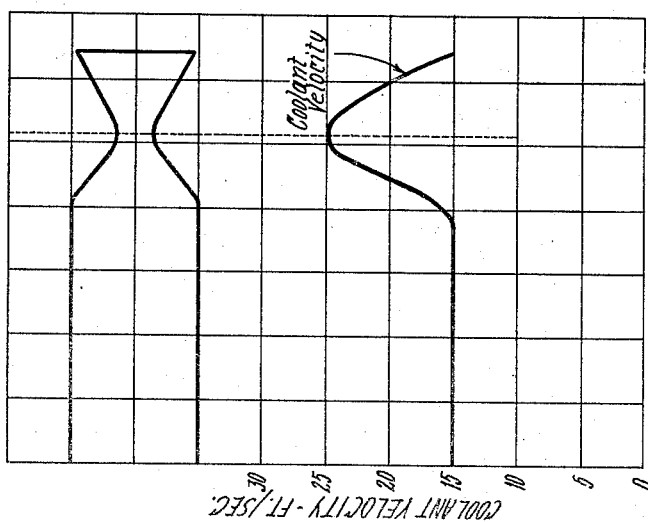
INVENTOR
EDWARD A. NEU, JR.
BY
AGENT June 22, 1965     E. A. NEU, JR     3,190,070
REACTION MOTOR CONSTRUCTION
Filed April 5, 1950     4 Sheets-Sheet 4

INVENTOR
EDWARD A. NEU, JR.
BY
AGENT

Patented June 22, 1965

3,190,070
REACTION MOTOR CONSTRUCTION
Edward A. Neu, Jr., Denville, N.J., assignor, by mesne assignments, to Thiokol Chemical Corporation, a corporation of Delaware
Filed Apr. 5, 1950, Ser. No. 154,056
10 Claims. (Cl. 60—35.6)

This invention relates, in general, to jet reaction motors of the kind which burn a fluid fuel in a combustion chamber in order to create a thrust force by means of the reaction brought about by rapid expulsion of the gaseous products of combustion through an exhaust nozzle located at the open end of the combustion chamber. It relates more particularly to such a motor which burns a fluid fuel in the presence of an oxidizer other than atmospheric air and is cooled by a flowing liquid or gas. It also relates to such a motor in which the fuel or oxidizer, or both, acts as a coolant before entry into the combustion chamber.

An object of the present invention is to provide an improved wall construction for the combustion chamber and exhaust nozzle side walls of such a motor whereby more efficient operation of the motor is obtained through the use of higher operating pressures made possible by increased structural strength.

Another object of this invention is to provide, for a reaction motor, a combustion chamber and exhaust nozzle of considerably lighter weight and reduced physical dimension than has heretofore been possible in motors of equivalent thrust output.

Another object of the present invention is to provide a form of construction by means of which the effectiveness of the coolant in cooling the material of the walls of the combustion chamber and exhaust nozzle of a reaction motor is improved by control of the velocity of flow of coolant at critical areas.

Another object of this invention is to provide a combustion chamber and exhaust nozzle for a reaction motor, in which the coolant is made to enter and leave the coolant jacket at the same end of the motor with a resultant saving in weight, space requirements and complexity.

Another object of this invention is to provide a simple and easily constructed reaction motor thrust chamber, that is, the combustion chamber and exhaust nozzle, wherein the number of different parts is at a minimum.

Another object of the present invention is to provide a reaction motor wherein the thrust chamber is so constructed that it has considerable durability from the standpoints of repeated operation, handling and shipping.

Another object of the present invention is to provide a means of construction for the walls of a reaction motor thrust chamber wherein longitudinal portions of the wall may be replaced if damaged or defective and the chamber salvaged.

Another object of the present invention is to provide a reaction motor thrust chamber through which fuel or oxidizer, or both, for the motor can be circulated in a desired direction for cooling purposes and for adding heat to the fuel before it is burned to provide a thermal regenerative effect.

Other objects and advantages will become apparent from the general and detailed description which follows.

In the drawings:

FIGURE 1 is a cutaway view of a rocket motor showing its walls of longitudinal tubes.

FIGURE 2 is a cross section taken on lines 2—2 of FIGURE 1.

FIGURE 3 is a cross section taken on lines 3—3 of FIGURE 1.

FIGURE 4 is a cross sectional view similar to FIGURE 2 showing an alternate or modified cross sectional configuration.

FIGURE 5 is a cross sectional view similar to FIGURE 2 showing another alternate or modified cross sectional configuration.

FIGURE 6 is a cross sectional view similar to FIGURE 3 showing an alternate or modified cross sectional configuration.

FIGURE 7 is a cross sectional view similar to FIGURE 3 showing another alternate or modified cross sectional configuration.

FIGURE 8 is a curve chart showing decrease of propellant consumption and decrease of physical size both occurring with increase in combustion chamber pressure. It also shows the substantial saving in weight effected by construction of a reaction motor in accordance with the present invention.

FIGURE 9 is a cross sectional view of a portion of a longitudinal conduit in which the cross sectional area has been reduced for a portion of its length.

FIGURE 10 is a curve chart showing the increase in coolant velocity effected at the nozzle throat by local reduction of conduit cross sectional area.

Figure 11:
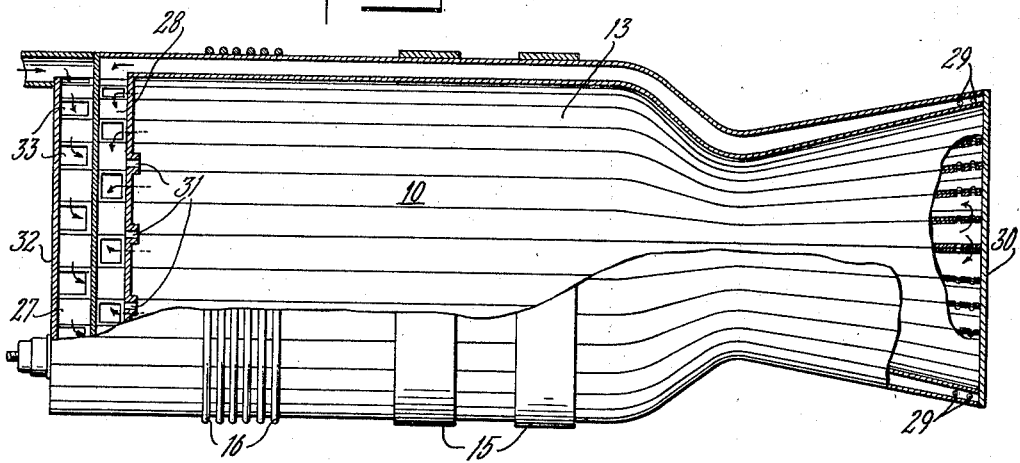
FIGURE 11 is a cutaway view of a rocket motor showing an alternate arrangement of admitting coolant.

It has been indicated in the objects of this invention that it relates to a construction for the side walls of the combustion chamber and exhaust nozzle of a reaction motor. The type of wall construction employed provides a wall of great strength for a minimum of material, thus making the device highly efficient from a weight-power standpoint. Since motors of this sort are used primarily to power aircraft or other vehicles where light weight is of great importance, an improvement in construction which provides a higher power to weight ratio becomes extremely useful.

The present invention makes it possible to achieve a considerably higher thrust output for a given weight of combustion chamber and exhaust nozzle than has heretofore been possible with more conventionally constructed types of rocket motors such as, for example, those having solid walls or those having double walls of relatively thin material formed by placement of a jacket about, spaced from, and concentric with an inner wall of a combustion chamber and nozzle. The distinct improvement in rocket motor efficiency achieved by means of the invention described in this specification will be evident from a brief discussion of some of the underlying factors which govern the design of such motors.

Reaction motors of the type described herein, commonly called rocket motors, do not depend upon atmospheric air for oxygen to support combustion of the fuel which the motor is to burn, but instead utilize an oxidizer, such as liquid oxygen, for this purpose or any other combination of chemicals producing a highly exothermic reaction. Such an oxidizer and a fuel are known as propellants and are usually supplied separately to the combustion chamber of the motor where they are intermingled and the fuel is ignited. Because of the very rich oxygen atmosphere in which the fuel burns, a flame of such a high temperature is created that it becomes imperative to cool the combustion chamber and exit nozzle to prevent melting of the material of the walls and consequent destruction of the motor. It has been found that air cooling is not sufficient for this purpose and consequently a motor of reasonable size and weight having air-cooled solid walls of any present day material is limited, for lack of proper cooling, to a very brief operating life. Conversely, a rocket motor having liquid cooled walls has been found to be capable of operation for considerably longer periods of time without failure. Further, it has been found that it is far more efficient from both weight and thermodynamic standpoints to use one or both of the propellants as a coolant for the walls where they absorb heat which they then carry into the combustion chamber to provide a regenerative effect.

To continue with a discussion of the principles of rocket motor design pertinent to this invention and propellant cooled regenerative motors of conventional construction, it can be stated that it has been found in general that the higher the pressure within the combustion chamber, the greater is the efficiency of the motor in its consumption of fuel for a given thrust. The curve chart shown in FIGURE 8 as a theoretical optimum shows this clearly. Thus, as high a combustion chamber pressure as can be tolerated structurally is advisable and highly desirable. The strength necessary simply to resist the chamber bursting pressure is not the limiting factor in the structural design, however, for the cooling propellant must pass through the cooling jacket of the thrust chamber at a greater pressure than that within the combustion chamber in order that it can force its way into the combustion chamber, this greater pressure thus causing the limiting factor of the design to be the structural resistance of the cooling jacket to deformation or rupture from its internal pressure, particularly at the outer end of the nozzle where the propellant pressure is high and the pressure of the exhausting gases from the combustion chamber is very low. For this reason, conventionally constructed motors have commonly been held to an operating combustion chamber pressure of about 300 pounds per square inch while motors constructed as indicated in the present invention are capable of operating with a chamber pressure of at least 1000 pounds per square inch.

A study of FIGURE 8 shows that a motor operated at this high chamber pressure would theoretically be approximately 14 percent more economical of propellants, alcohol and liquid oxygen in this case, than a motor operated at the lower pressure despite the fact that both produce the same amount of propulsive thrust, which is, for purposes of comparison, assumed to be 20,000 pounds. It is to be understood that although a saving in propellant consumption is indicated specifically in the foregoing, the improvements in operating efficiency can be translated into increased duration of operation for a given amount of propellants with a resultant increase in range of the vehicle being propelled, or for a given duration of operation a decrease in size and weight of propellant tankage and associated equipment. These advantages are further enhanced by the fact that the thrust chamber constructed in the manner shown in this specification and operated at a high combustion chamber pressure is much lighter in weight and smaller in physical size than the more conventional thrust chamber of equivalent thrust output, thus resulting in a still greater economy of propellants if the motor is used to propel a vehicle where the additional weight becomes a factor. Consideration of a fundamental equation for the thrust of a rocket motor shows, in part, how a substantial reduction in physical size and weight is achieved by an increase in combustion chamber pressure. This equation is:

$$T = P_c \times A_T \times C_N$$

where $T$ = thrust output
$P_c$ = combustion chamber pressure
$A_T$ = cross sectional area of nozzle throat
$C_N$ = a nozzle coefficient It has been found that $C_N$ will increase with an increase in $P_c$, thus if T is to be constant, an increase in $P_c$ increases $C_N$ and $A_T$ decreases. It has also been found that a decrease in $A_T$, the throat area, generally results in a decrease of the cross sectional area of the combustion chamber while its length is the same or may become less. Since a motor having side walls constructed in accordance with the present invention is capable of withstanding very high pressures and yet can use thin and lightweight material because of its structural distribution and improved cooling, a substantial decrease in its weight and physical dimensions is achieved. This is indicated by the approximate weight curve shown in FIGURE 8 and the reduction in size is indicated by the physical size (diameter) curve in that figure, both of which are plotted against combustion chamber pressure. This reduction in weight and reduction in size is important to any such motor, particularly in the case where the motor is located at the tail of an aircraft where space limitations are severe and weight must of necessity be kept small in order to reduce the unbalancing moment created by the considerable distance of the weight from the center of gravity of the aircraft. Similar considerations would apply to other vehicles as well.

The exceptional strength of the walls of the motor described herein lies in the use of individual longitudinal tubes which are placed side by side to form a fluid tight and pressure resistant enclosure, the adjacent sides of the tubes acting as closely spaced structural members. Additional strength can be gained through the use of a cross section for the tubes of a shape which resists deformation from the high pressure of the fluid propellant passing through them. Improvement of cooling effectiveness is attained by the exposure of a maximum of surface to the cooling fluid, control of coolant velocity, and by the use of thin material of high thermal conductivity made possible by the large cooling surface area and high strength configuration. The detailed description which follows will show how these gains have been made possible by the present invention.

In FIGURE 1 is shown a rocket motor combustion chamber 10, a head 11, and an exhaust or exit nozzle 12, the combination being commonly termed a thrust chamber, the side wall of which is composed of a group of formed and shaped individual longitudinal tubes 13 placed side by side to form a substantially circular thrust chamber of compound curvature and held in place by an outer covering 14 of metal, plastic or other suitable material applied by spraying or otherwise as may be suitable. Covering 14 acts as both a sealing material to prevent leakage of gases from the thrust chamber and as a structural member to resist the bursting forces brought about by combustion within combustion chamber 10. It is also possible to solder, weld, or braze each tube to its adajcent tubes in order to seal the gases within the thrust chamber and then apply metal tension bands 15 for wire winding 16 to the exterior of the thrust chamber as shown in FIGURE 11 to act as structure to help resist the bursting forces.

The side wall of the thrust chamber thus has through it a series of longitudinal coolant passages continuous throughout its length. There is then, in effect, an inner wall 17, an outer wall 18, and passage side walls 19, FIGURE 2, which serve the purposes of directing the flow of coolant, acting as additional surface area for the transmission of heat from inner wall 17 to the coolant, and, most important of all, acting as structural stiffeners and stays to resist outward bending and to support the thrust chamber inner wall 17. Tubes 13 are made of easily formed material of high heat conductivity such as copper or aluminum and are formed by the use of common forming dies with concurrent application of internal pressure to prevent collapse of the tube. After the forming operation, the tubes have a longitudinally curved shape substantially as shown in FIGURE 1 and a trapezoidal cross section as shown in FIGURES 2 and 3, the cross section being elongated and made narrower at the nozzle throat and at other stations of relatively small diameter of the thrust chamber in order that the diameter at those stations will be proper when the tubes are placed together in the manner shown. When the tubes are placed together the convergent side walls of each bear upon a similar side wall of each adjacent tube in the manner shown in FIGURES 2 and 3 so that a substantially circular thrust chamber having a compound inward curvature at the nozzle is formed. Thus, in the plane of the cross section there are two convergent sides to each tube which sides would, if extended, meet at a point in the same plane on the longitudinal axis of the thrust chamber as indicated by the dotted lines in FIGURES 2 and 3.

Although a trapezoidal cross section for the tubes is indicated above and is satisfactory for most conditions of high pressure within the tube, a similar cross section having the inner side, that is, the side nearest the interior of the thrust chamber, shaped as a circular arc as shown in FIGURES 4, 5 and 6 permits a still higher differential between the high pressure within the tube and the relatively low pressure within the thrust chamber. A condition such as this exists at the exit end of the nozzle where the pressure in the tube must be great enough to force propellant through the tubes and into the combustion chamber against the high pressure of combustion therein, but the pressure of the exhausting gases from the interior of the thrust chamber becomes atmospheric or less. Thus, if an exceptionally high combustion chamber pressure is used, it would be desirable to utilize this cross sectional configuration at those portions of the tube where the pressure differential is critically great, or throughout the entire length of the tube. With this configuration, the material required to resist deformation is less since a circularly curved surface of this sort is the optimum shape for resisting internal pressure. This configuration thus gives a further saving in weight and yet is even stronger than the trapezoidal cross section although both, or a combination of both in the same tube, are useful depending upon the extent of the pressures involved, the number of tubes utilized to form the thrust chamber, and other particular factors such as smoothness or approximate circularity of the nozzle throat. The fourth or outer side of the tube may also be in the form of a circular arc as shown in FIGURES 5, 6 and 7 for the same reason, although its shape is relatively unimportant if it is supported by covering 14 which can be made strong enough to resist outward bulging of this side. Furthermore, the fact that any tendency of this side to bulge is resisted by the tensile strength of covering 14 results in a force on the tube which tends to wedge the tube more tightly between its adjacent tubes. This is particularly true where the tube wall nearest the interior of the thrust chamber is circularly arcuate in form and thus cannot itself permanently deform unless the elastic limit of the material is exceeded.

Such configurations as above, or a combination of them in single tubes or different tubes, are considered to be within the scope of this invention, the outstanding reason for the great strength of a thrust chamber constructed in accordance with this invention lying, as previously stated, in the tube side walls 19 which act to support and stiffen the thrust chamber's inner wall 17 at a great many places about its periphery. The cross sectional configurations of the tubes described in this specification are related in that they all have, for at least a portion of their lengths, substantially flat non-parallel opposite sides making the cross sections substantially wedge-shaped regardless of whether the remaining sides of the tubes are curved or straight.

From the foregoing, it is evident that a saving in weight is made by the use of exceptionally thin lightweight material, the use of which is in part made possible by the structural arrangement indicated whereby very effective use of the material is made. The use of this material is further made possible by effective cooling as previously mentioned and as described in the following paragraphs.

As stated in the objects of this invention a means of controlling the velocity of flow of coolant is included. This is accomplished by changing the actual cross sectional area of the coolant tubes 13 by compressibly yielding the metal of the tubes during the forming operation at certain portions of the tubes as desired. This is accomplished through the use of forming dies which are so shaped as to form most of the length of the tube to the cross sectional configuration shown in solid lines as 13 or 13b in FIGURE 9, while simultaneously forming certain portions of the same tube to the cross section shown dotted in FIGURE 9 at 13a or 13c respectively. This is made possible by the yield of the metal of the tube, and the cross sectional area of the tube is reduced at those portions as indicated by the dotted line. That the cooling rate is improved by decreases in the cross sectional area of the coolant passages at the critically hot portions of the rocket motor thrust chamber, such as the nozzle throat, is evident from a consideration of the fundamentals of heat transfer, and flow of an incompressible fluid through a passage. It is well known that, for convective heat transfer to a moving fluid in a tube or passage, the local heat transfer rate increases with the fluid mass velocity (approximately as the 0.8 power of the latter) for a given temperature difference and a given coolant. For an incompressible fluid, the density remains nearly constant, consequently the mass velocity is proportional to the linear flow velocity. The total volume flow rate of coolant is constant at all points in the passage, hence the local linear velocity is inverse to the local flow cross-section, and the heat transfer rate (for a given temperature difference between wall and coolant) is inverse to the 0.8 power of the local flow cross-section.

Since the quantity of coolant flowing into and out of the passage is here the same for a given period of time, the only way in which the velocity of coolant flow can be increased at a particular portion of the thrust chamber is by a decrease in the cross sectional area of the passage where the high velocity and high cooling rate is desirable. In the embodiment shown here of the present invention, this has been done at the throat of the nozzle of the thrust chamber where the temperature of the gases of combustion is very high and where the wall is in very close contact with the hot gases as they pass through the constriction. How very effective this change in cross sectional area is in increasing the velocity of flow of the coolant is shown in FIGURE 10 where coolant velocity and passage cross sectional area are plotted against various stations along a rocket motor of the type described in the present invention. It can be seen from this that coolant velocity is much increased at the nozzle throat where passage cross sectional area is decreased.

Further consideration of the cross section of the coolant conduits having circularly arcuate inner walls shows still further improvement in cooling because of the large surface area exposed to the coolant about the combustion chamber and nozzle due to the circular arcuate shape, the large surface area exposed to the coolant, including that of the side walls of the tubes since they carry heat outward from the inner wall and transmit it to the coolant.

Reference again to FIGURE 1 will show that tubes or conduits 13 terminate at one end in manifold 20 and communicate with it, and at the opposite end terminate in and communicate with chamber 21 in head 11. Injector passages 22 connect chamber 21 with combustion chamber 10 as shown. In a central hole in head 11 is located an oxidizer injector which comprises a tube 23 having a head 24 with orifices 25 therein, these orifices leading into combustion chamber 10. A spark plug igniter 26 is threaded into head 11 and extends into combustion chamber 10.

In operation, a liquid fuel such as alcohol is forced under pressure through pipe 20a into manifold 20 from which it enters tubes 13 and flows through them thus cooling the wall 17 of combustion chamber 10. From tubes 13, the fuel enters chamber 21 in head 11 from whence it flows through injector passages 22 into combustion chamber 10.

A liquid oxidizer, such as liquid oxygen, is forced under pressure into oxidizer injector tube 23 from which it passes through orifices 25 into combustion chamber 10 where it mixes with the fuel. The fuel is ignited in combustion chamber 10 by an electric spark caused by passing an electric current through spark plug igniter 26. Other means of ignition can be used if desired. As the fuel is burned in the presence of this very rich oxidizer, a great quantity of heat is released resulting in an extremely high temperature in combustion chamber 10, the inner wall 17 of which would melt if it was not cooled by the fuel flowing over it as it passes through tubes 13, the inner walls of which form the wall 17 of chamber 10. Since the fuel becomes heated as it passes through tubes 13, it carries the heat into combustion chamber 10 adding to the efficiency of the motor by thermal regeneration.

In FIGURE 11 is shown an alternate thrust chamber so arranged that flow of the coolant is directed through one tube and returned through its next adjacent tube. A manifold 27 for inlet coolant, fuel in this case, is provided at the head end of the thrust chamber instead of at the nozzle end. Attached to manifold 27 and communicating with it is every other tube 13. The alternate tubes are connected into chamber 28 which is also at the head end. All tubes 13 terminate at the nozzle end of the thrust chamber and have holes 29 in their side walls near that end so that they intercommunicate. A flat ring 30 of relatively thick material is welded, brazed or soldered to the ends of tubes 13 to close them. The flow through the tubes with this arrangement can be traced from inlet manifold 27 into its connected tubes 13, along the length of the combustion chamber and nozzle, through holes 29 into the adjacent tube, back along the length of the nozzle and combustion chamber and into chamber 28 at the head end. From chamber 28, the fuel passes through orifices 31 into combustion chamber 10.

One of the principal advantages of such an arrangement is the reduction of weight and space required by a collector manifold at the exit end of the thrust chamber since it is possible to combine manifold 27 and chamber 28 into the head end of the combustion chamber as shown in FIGURE 11 by the addition of wall 32 fastened to the ends of the entry tubes which are cut away as shown at 33 to allow fuel to enter them. The fuel pipe 20a, shown in FIGURE 1 is also eliminated. Another advantage lies in a reduced number of tubes as compared with the arrangement shown in FIGURE 1 since they must be larger in cross sectional area in order to carry the amount of fuel otherwise carried by two tubes and reduction of the number of tubes appears to be the simplest way of maintaining the same thrust chamber dimensions as would be used in the arrangement shown in FIGURE 1.

Figure 12:
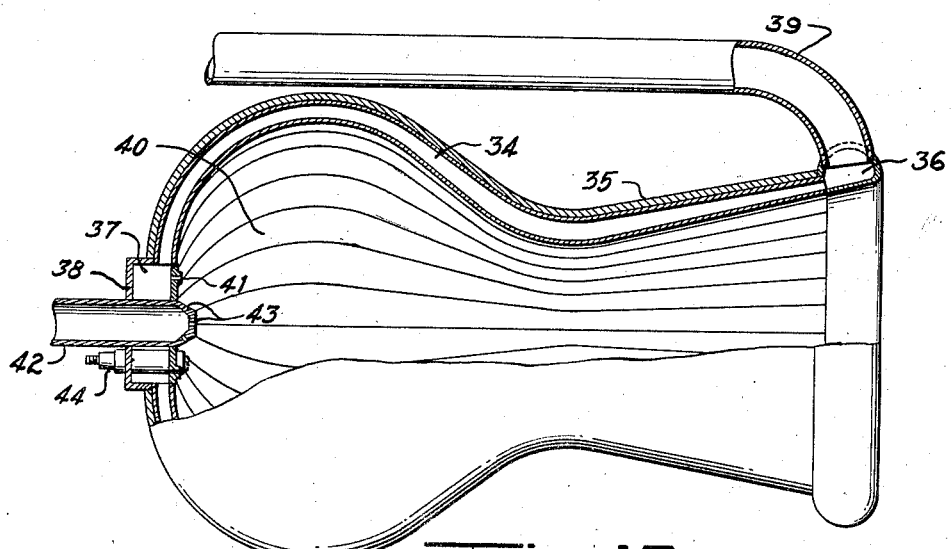
FIGURE 12 is a cutaway view of a rocket motor having curved walls throughout the length of its combustion chamber.

Although the embodiment of the invention shown in this specification is a thrust chamber having a substantially cylindrical combustion chamber, the wall construction employed does not limit the chamber to such a configuration. Combustion chambers and nozzles of a variety of contours and shapes can be made of conduits which have been properly formed before assembly. An example of such a thrust chamber is shown in FIGURE 12 where the walls are formed of tubes curved throughout the entire length of the combustion chamber to form a chamber having bulging walls. In FIGURE 12, longitudinal conduits or tubes 34 having cross sectional configurations such as previously described for other shapes of thrust chambers are placed side by side and an outer covering 35 is applied. Tubes 34 terminate in a manifold 36 at the exhaust end of the thrust chamber and in chamber 37 within head 38. A propellant then is fed into manifold 36 through pipe 39 and passes from manifold 36 through tubes 34, into head chamber 37, from whence it passes into combustion chamber 40 through orifices 41. The second propellant is fed through injector pipe 42, and through orifices 43 into combustion chamber 40 where it intermingles with the other propellant and where the mixtures can be ignited by an electric spark from spark plug 44.

With the type of side wall construction employed in the present invention, a reaction motor of considerable durability is provided both from the standpoint of repeated operation and from the standpoints of increased resistance to damage to the thrust chamber during handling and shipping or as the result of gunfire should the motor be installed in a military aircraft. This durability is achieved by the cellular construction of the walls of the thrust chamber and the strong outer covering 14 applied to its exterior.

An important advantage of this type of construction lies in the ease of manufacture and repair of the thrust chamber. A thrust chamber constructed in the manner shown in this specification has very few different parts to complicate its manufacture as all of the tubes used in the side walls can be identical, thus making possible the use of only one set of dies for the tube forming process. The application of outer covering 14 is also a simple matter. Repair in the event of a defective or damaged conduit or conduits can be accomplished easily by removal of the outer covering for the faulty tubes and then removing them, replacing them with new ones, and replacing the outer covering. In the case of thrust chambers of more conventional construction, it would be necessary to replace the whole damaged wall or even the entire thrust chamber.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A reaction motor combustion chamber and exit nozzle having a side wall of individual longitudinal coolant conduits of curved longitudinal contour and trapezoidal cross section sealably attached side by side to form a fluid tight and pressure resistant enclosure, said conduits being reduced in cross sectional area at the throat of the exit nozzle of said thrust chamber to increase the velocity of flow of said coolant.

2. A rocket combustion chamber comprising a plurality of tubes in side-by-side relationship to form a shell of circular cross section and varying diameter, said tubes having varying dimensions in a circumferential direction relative to the axis of the chamber whereby the cross-section of the tube is reduced at the minimum diameter of the combustion chamber to increase the velocity of the contents of the tube flowing therethrough, the center line of each tube being coplanar with the center line of the chamber.

3. The invention set forth in claim 2 with the tubes reduced in height to reduce their cross-sectional area at the lesser diameters of the shell.

4. The invention set forth in claim 2 with said tubes being varied in cross sectional area at the lesser diameters of said shell by varying the width and height of said tubes.

5. The invention set forth in claim 2 with the tubes decreased in both width and height to reduce their cross-sectional area at the lesser diameters of the shell.

6. A rocket combustion chamber of circular cross section and varying diameter comprising a plurality of polygonal tubes in side-by-side relationship to form a tubular shell, one wall of said tubes forming an outer wall of the combustion chamber and a second wall of said tubes forming an inner wall of the combustion chamber, said tubes varying in width throughout their length as required to form a variable circumference in the rocket chamber wall, the cross sectional area of said tubes varying along their length in direct proportion to the variation of the cross sectional area of the combustion chamber whereby the velocity of the contents of the tubes is increased to a maximum at the minimum cross section of the combustion chamber.

7. In a reaction motor thrust chamber, a side wall comprising a multiplicity of longitudinal coolant conduits of curved longitudinal contour fastened side by side to form a fluid tight and pressure resistant enclosure, the cross sectional shape of each of said conduits for at least a portion of their length being defined as that plane geometric figure having one side in the form of a circular arc, two non-parallel straight sides opposite to one another and tangent to said circular arc, said non-parallel sides being at such angle to one another that if extended they would intersect at a point on the longitudinal central axis of said enclosure in the plane of said cross section, and a fourth side.

8. In a reaction motor thrust chamber, a side wall comprising a multiplicity of longitudinal coolant conduits of curved longitudinal contour fastened side by side to form a fluid tight and pressure resistant enclosure, the cross sectional shape of each conduit for at least a portion of its length being defined as that plane geometric figure having two opposite sides in the form of circular arcs of unequal radii and two opposite non-parallel straight and equal sides tangent to said circular arcs, said non-parallel sides being at such angle to one another that if extended they would intersect at a point on the longitudinal central axis of said enclosure in the plane of said cross section.

9. A rocket combustion chamber of circular cross section having in the direction of gas flow a substantially cylindrical main combustion section, a throat section converging to a minimum diameter smaller than that of said main portion and a nozzle section diverging from the minimum diameter of said throat section, the wall of said combustion chamber being formed of a plurality of thin walled tubes through which a coolant may be passed, said tubes being placed in parallel touching relationship about the circumference of said chamber and each extending for the full length of the chamber in the direction of gas flow in said chamber, said tubes having large cross-sections in said main combustion section and being gradually flattened in a radial direction in converging to said minimum diameter in said throat section and gradually returning to a large cross-section in diverging from said minimum diameter in said nozzle section, whereby the cross-sectional area of said tubes in the vicinity of said minimum diameter of the combustion chamber is reduced to increase the velocity of the coolant in said tubes for increased cooling at this point.

10. Apparatus as claimed in claim 9 in which a gastight seal is produced between each pair of tubes by a continuous filling of metal between each pair of adjacent tubes, said filling being made on the outside of said combustion chamber wall so as not to retard heat flow from the hot gas of said chamber through the walls of said tubes to the coolant.

References Cited by the Examiner

UNITED STATES PATENTS

| | | | |
|---|---|---|---|
| 2,074,098 | 3/37 | Adams | 60—44 |
| 2,395,403 | 2/46 | Goddard | 60—35.6 |
| 2,408,112 | 9/46 | Truax et al. | 60—35.6 |
| 2,523,656 | 9/50 | Goddard | 60—35.6 |
| 2,540,594 | 2/51 | Price | 60—31.71 |
| 2,958,183 | 11/60 | Singelmann | 60—39.66 |

FOREIGN PATENTS

| | | |
|---|---|---|
| 376,974 | 7/32 | Great Britain. |
| 459,924 | 1/37 | Great Britain. |

SAMUEL LEVINE, *Primary Examiner.*

JOSEPH A. KURZ, SAMUEL BOYD, JAMES L. BREWINK, *Examiners.*